(12) United States Patent
Chen

(10) Patent No.: US 8,203,285 B2
(45) Date of Patent: Jun. 19, 2012

(54) HIGH-BRIGHTNESS LED LAMP WITH BATTERY CONSERVATION

(75) Inventor: Chi Gon Chen, Guang Zhou (CN)

(73) Assignee: International Development LLC, Roanoke, TX (US)

( * ) Notice: Subject to any disclaimer, the term of this patent is extended or adjusted under 35 U.S.C. 154(b) by 398 days.

(21) Appl. No.: 12/491,082

(22) Filed: Jun. 24, 2009

(65) Prior Publication Data

US 2010/0327782 A1    Dec. 30, 2010

(51) Int. Cl.
*H05B 37/02* (2006.01)
(52) U.S. Cl. .................................. 315/307; 315/326
(58) Field of Classification Search .............. 315/307, 315/312, 291, 297, 326, 360
See application file for complete search history.

(56) References Cited

U.S. PATENT DOCUMENTS

| | | | | |
|---|---|---|---|---|
| 7,988,320 B2* | 8/2011 | Brumels | ...................... | 362/192 |
| 2007/0002561 A1* | 1/2007 | Tesmer et al. | ................. | 362/183 |
| 2009/0020607 A1* | 1/2009 | Perera | ........................... | 235/440 |
| 2009/0084431 A1* | 4/2009 | Briee et al. | .................... | 136/246 |
| 2011/0018448 A1* | 1/2011 | Metchear et al. | ............. | 315/152 |

\* cited by examiner

*Primary Examiner* — Don Le
(74) *Attorney, Agent, or Firm* — Brian Harris

(57) ABSTRACT

A high-brightness LED lamp with battery conservation and solar charging features. The portable, self-contained lamp utilizes one or more high-brightness LEDs to provide area or decorative illumination. A solar cell charging device maintains the rechargeable batteries during the daytime with available ambient light. An electronic control circuit conserves battery power by limiting the period of time that the LEDs are energized during nighttime hours when ambient lighting conditions cannot support the recharging function. A photodetector device allows the control circuit to make this determination.

9 Claims, 4 Drawing Sheets

HIGH-BRIGHTNESS LED LAMP WITH BATTERY CONSERVATION

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to solar powered outdoor lighting, and more specifically, to high-brightness solar powered outdoor lighting incorporating specialized control circuitry for maximizing battery runtime.

2. Description of Related Art Including Information Disclosed Under 37 CFR 1.97 and 1.98

Solar powered outdoor lighting is well known in the art. Such lights typically utilize a rechargeable battery that receives its charge from solar panels during the daytime and expends its charge during the nighttime by powering the light source. Depending upon the light source, the battery may or may not last for the entire period of darkness.

With the advent of LEDs, battery runtime for outdoor lighting has improved over older incandescent devices. However, early LEDs sacrificed luminosity for the reduced current demand. These LEDs were often not sufficiently bright enough to be useful for other than decorative applications. To be useful for security or safety applications, such lights needed to be substantially brighter.

Recent developments in LED technology have resulted in lighting having substantially higher luminosity. Use of high-brightness LEDs allows for outdoor lighting that is bright enough to be practical for a host of applications (decoration, security, safety, etc.). Consequently, this higher light output again translates to higher current demands and reduced battery runtime. Thus, although the lighting is highly efficient relative to early incandescent bulbs, the current demand is beginning to rival the same.

In an effort to improve runtime with high-brightness LEDs, designers have resorted to increasing the overall battery capacity by increasing the number of cells or by using exotic chemical formulations having higher energy densities. However, increasing the number of cells results in larger and less aesthetically pleasing lighting fixtures. Also, utilizing higher energy-density battery formulations increases the cost of the battery and, consequently, the cost of the lighting fixture. What is needed is an improved control means for utilizing the available standard rechargeable battery capacity to efficiently power a high-brightness LED lighting fixture without increasing the fixture's physical size.

BRIEF SUMMARY OF THE INVENTION

The invention provides a battery-powered outdoor lamp that is self-contained and portable. The batteries are rechargeable and capable of being recharged using a solar cell device. The lamp utilizes one or more high-brightness LEDs, preferably in groups of three, six, or twelve. To reduce the battery consumption, a timing circuit controls the duration that the LEDs are energized to between four and eight hours, but preferably six hours.

The invention also includes a method for controlling the battery consumption in a battery-powered outdoor lamp that utilizes high-brightness LEDs for illumination. The method steps include providing an electronic timing circuit that controls energization of the LEDs and subsequent de-energization after a period of time has elapsed. Provision of a photodetector device is also included for automatic detection of ambient lighting conditions. This allows the lamp to sense when the LEDs should be energized by the timing circuit. To reduce the battery consumption, the timing circuit controls the duration that the LEDs are energized to between four and eight hours, but preferably six hours.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 1:
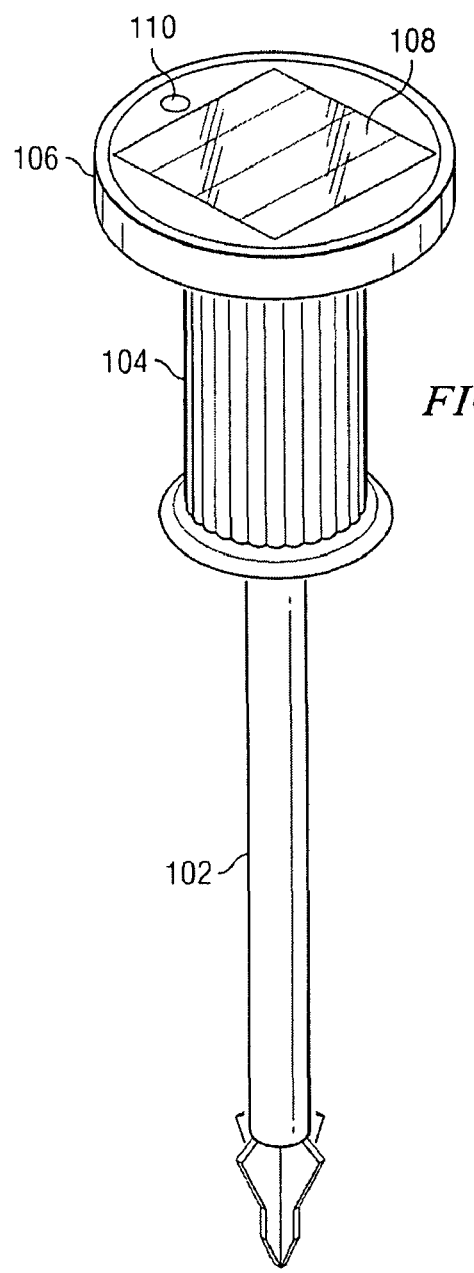
FIG. 1 is a frontal view of an embodiment of a solar powered lamp utilizing the claimed high-brightness LEDs and novel control circuitry of the present invention.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

FIG. 1 depicts a first embodiment of the present invention. This embodiment is a solar powered outdoor lighting fixture that can be located and operated in any area that receives daytime exposure to sunlight. As shown, the light features three main components: a support assembly (102), a light assembly (104), and a control assembly (106).

The support assembly (102) in this embodiment is a rigid cylindrical shaft constructed from machined aluminum. Aluminum is chosen to reduce corrosion and cost and to create a sturdy yet aesthetically pleasing support. However, one skilled in the art will appreciate that the shaft may also be manufactured using polymers (such as plastics or the like) or other metals (such as mild steel or the like). Moreover, although the shape is cylindrical, the shaft may be extruded or machined into other shapes (such as a pentagon or the like) or feature other defining features or demarcations. The shaft provides rigid support for the light and control assemblies and allows the light fixture to be inserted into the ground for proper placement.

The centerline of the shaft (102) in this embodiment is hollow to support and house the rechargeable batteries used to power the device. The cells are arranged within the shaft in a manner similar to a typical handheld flashlight, with the individual cells connected together in a series, parallel, or series/parallel fashion. The chosen wiring arrangement depends upon the individual cell energy densities and the control circuitry current demands.

The present embodiment utilizes LiFePO4 rechargeable batteries. Such batteries provide a higher energy density than nickel-cadmium (NiCad) or nickel-metal hydride (NiMH) batteries and do not suffer the memory effect on subsequent recharges. Such batteries are also more inexpensive than lithium batteries, albeit less efficient and lower in capacity. Still, one skilled in the art will appreciate that any battery technology may be utilized and is within the scope of the present invention.

The light assembly (104) of the present embodiment houses high-brightness LEDs. The assembly features a transparent housing constructed from glass. Other embodiments utilize a textured, colored, or even frosted translucent housing to provide differing illumination effects. Although the present embodiment uses glass, polymers capable of transmitting light yet protecting the lighting components from the elements may also be utilized.

Within the housing (104) is a space for a fixture that supports any device capable of converting electricity into light. In the case of the present embodiment, the light generating device is a high-brightness LED such as model # LC503TWN1-15Q-A0 manufactured and produced by Cree, Inc. This model produces a cool white light with a luminous intensity of 18000 mcd at 20 mA forward current. Other models and types of LEDs may be utilized and are within the scope of the present invention.

Figure 3:
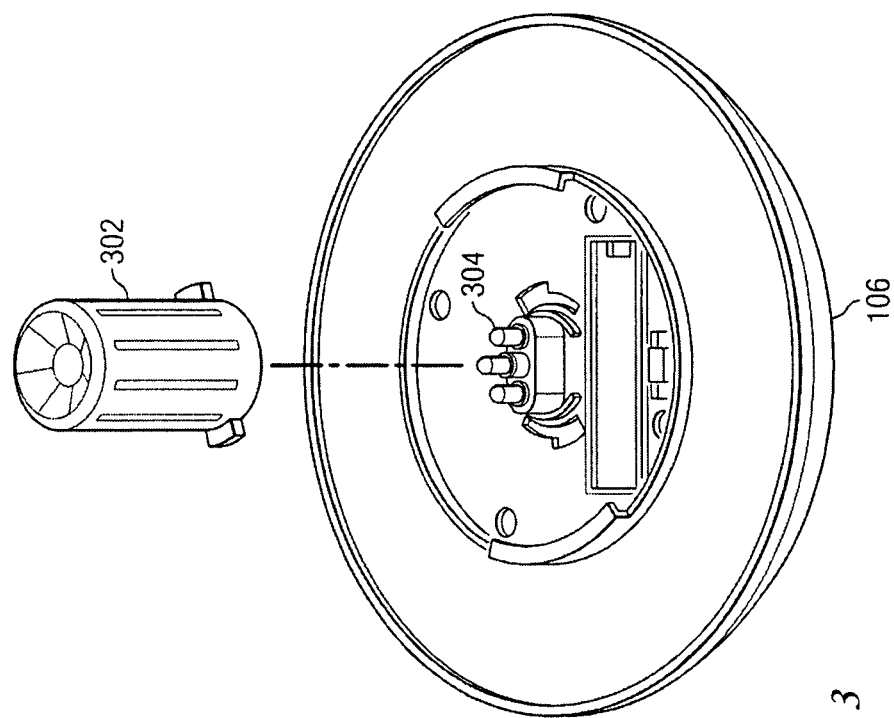
FIG. 3 is a prospective view of an embodiment with the control assembly removed to show a three LED arrangement.
Figure 3:
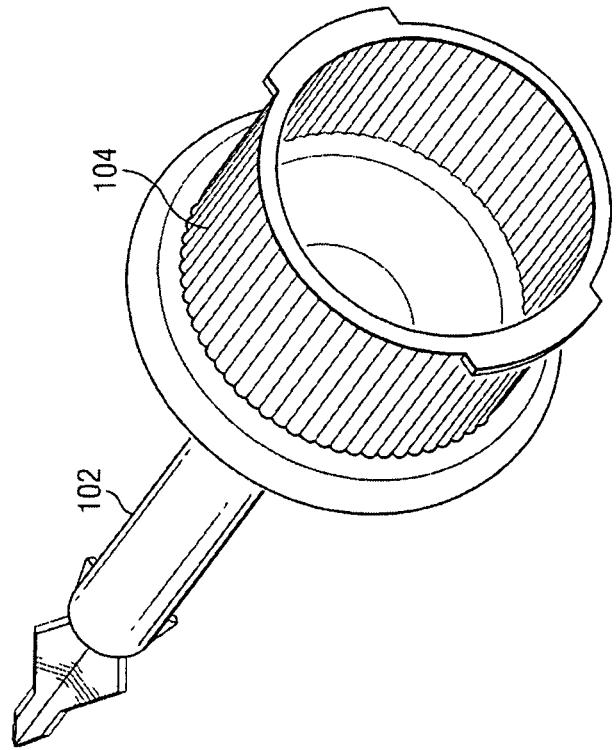
Figure 4:
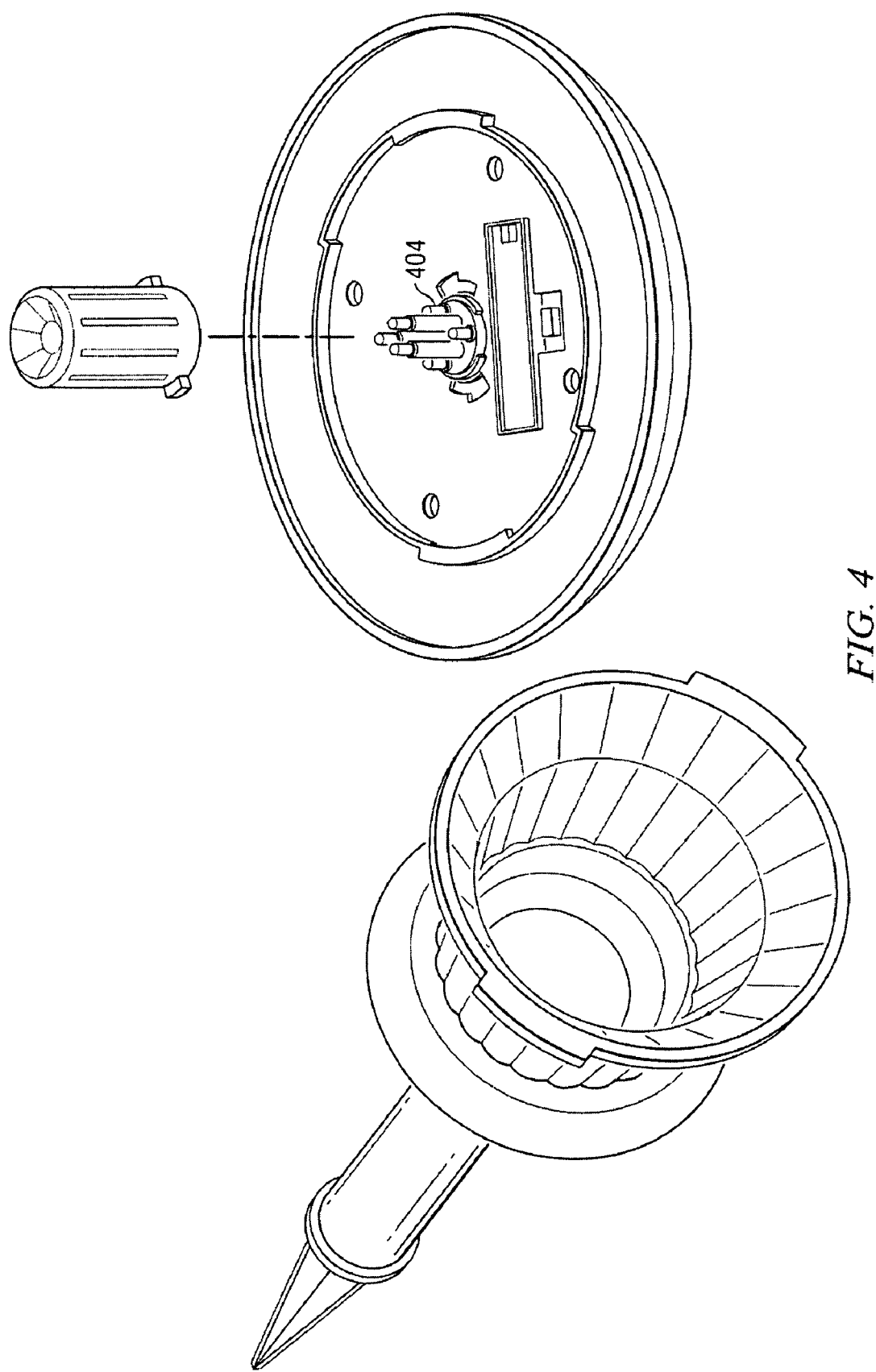
FIG. 4 is a prospective view of an embodiment with the control assembly removed to show a six LED arrangement.

The number of LEDs utilized in the light assembly is dependent upon the overall light output desired. In the present embodiment, three such high-brightness LEDs are utilized and are distributed radially around the assembly for even light distribution. FIG. 3 depict such an arrangement. In FIG. 3, the control assembly (106) is depicted having been removed from the housing (104). Beneath the control assembly (106) is a lens (302) that shields the three LEDs (304) and conditions the emitted light. Another embodiment utilizing six LEDs is depicted in FIG. 4. In this figure, the control assembly is removed as is the lens (404) to display the six-LED (406) configuration. Still, other embodiments containing even more such LEDs may be utilized to further increase the device's overall brightness. Such arrangements are limited only by the capacity of the batteries of the device.

Figure 2:
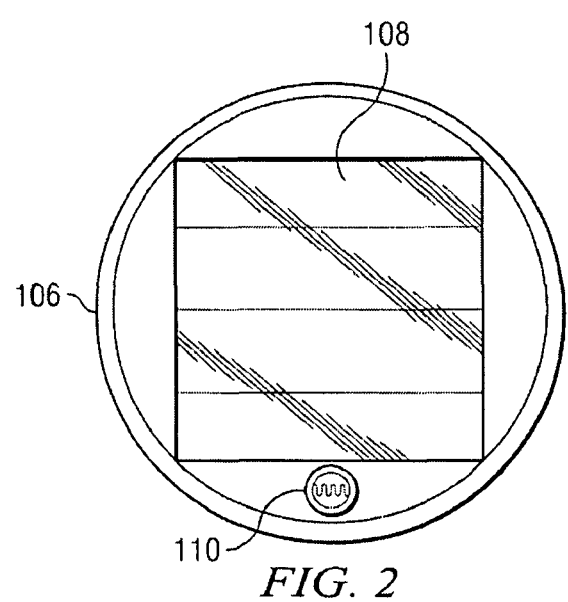
FIG. 2 is a top view of the embodiment, showing the solar cell and photovoltaic cell of the battery conservation control circuitry.

Referring once more to FIG. 1, the control assembly (106) in the present embodiment houses the control circuitry for the LEDs and batteries. Visible on the top of the device is a solar cell (108) for charging the batteries and a photocell (110) for determining the ambient light conditions. FIG. 2 provides a close-up depiction of the arrangement of the solar cell (108) and photocell (110) on the top of the lighting fixture in the present embodiment.

Figure 5:
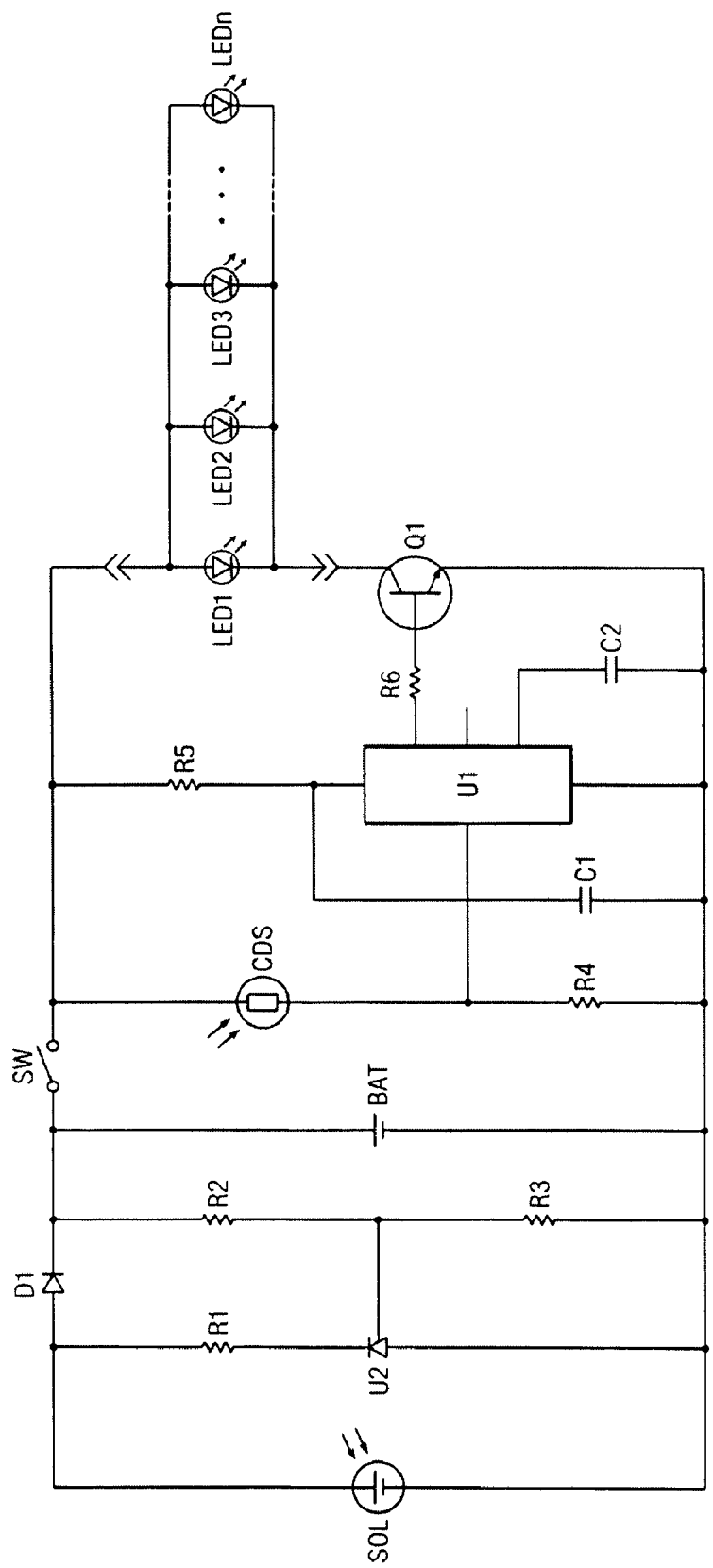
FIG. 5 is a schematic diagram of the battery conservation control circuitry.

FIG. 5 depicts a schematic diagram of the control circuitry of the lighting fixture. The schematic shows the solar cell (SOL), battery (BAT), photocell (CDS), timer (U1), high-brightness LEDs (LED 1-LEDn), and associated driver circuitry (Q1).

The solar cell (SOL) is continually connected to the battery (BAT) via charging circuitry that regulates the solar cell's output. Thus, the battery is constantly charging when sufficient ambient light is present even when the power source is disconnected (SW) from the timer (U1). This ensures a ready supply of battery energy when the light is brought into service.

At the heart of the illumination control circuitry is a non-programmable timing device. The timing device (U1) in the present embodiment is of the 555 timer variety. As the ambient light drops, the photocell (CDS) resistance increases, changing the voltage drop across R4. This is sensed by the timer (U1) which then biases on the switching transistor (Q1) to energize the LEDs. The timer (U1) then biases off the switching transistor (Q1) to de-energize the LEDs after a fixed interval. In the present embodiment, the timing device (U1) utilizes a resistor/capacitor ("RC") combination to establish a fixed timing period. The fixed period in the present embodiment is six hours. This effectively provides six hours of nighttime illumination before the LEDs are de-energized. Although the period specified in this embodiment is six hours, it may be as low as four and as high as eight depending on the number of LEDs which must be energized.

Six hours is typically sufficient for most applications since use of the light in the late hours of the evening is unnecessary when most individuals are indoors. Moreover, by limiting illumination to a fixed timing interval it is possible to anticipate the total battery capacity necessary to effectively operate the light. In another embodiment the timing interval may be four hours, which then only requires four hours of battery capacity. Likewise, another embodiment may provide a timing interval of eight hours, which would require greater battery capacity to sustain this period.

The control circuitry drives one or more high-brightness LEDs (LED1-LEDn) for light output. Each LED is connected in parallel. To switch the LEDs to the on state, the timer device (U1) energizes a transistor switch (Q1). Use of the transistor switch (Q1) allows the relatively low current output from the timer (U1) to switch the relatively high-current LED (LED1-LEDn) loads.

While high-brightness LEDs are discussed herein, it will be appreciated that any other LEDs may be utilized without straying from the inventive concept. Use of lower output LEDs will further serve to reduce battery demand and allow the light to operate over an even greater timeframe.

In another embodiment the timing device (U1) may be a programmable microcontroller. Such a programmable microcontroller runs stored program codes to effectuate the timing and LED driving signals. For example, the microcontroller program may periodically sample the voltage across R4. If the voltage drops to a certain threshold, the microcontroller can then energize the LEDs by biasing on the switching transistor (Q1). As the LEDs are held on, the microcontroller may continually poll the voltage across R4 to determine if the LEDs are no longer necessary (i.e., ambient light is sufficient such that the light is not needed). Alternatively, the microcontroller can increment a numeric variable at a constant rate to achieve the stated six hour time period, at the end of which the LEDs are de-energized by biasing off the switching transistor (Q1). In yet another embodiment the output of the microcontroller can energize and de-energize the LEDs in a quick, random fashion to simulate a candle flickering. One skilled in the art will appreciate that such use of a microcontroller for a timing device is within the scope of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

I claim:

1. A battery-powered portable outdoor lamp, the lamp comprising:
   a solar charging device;
   at least one high-brightness LED;
   an electronic timing circuit, wherein the timing circuit controls the application of battery power to the at least one LED to conserve battery capacity by limiting the amount of time that the at least one LED is energized; and
   a cylindrical shaft, wherein the cylindrical shaft linearly houses the battery power source.

2. The lamp of claim 1 wherein the timing circuit comprises a photodetector device, wherein the photodetector device influences the operation of the timing circuit.

3. The lamp of claim 2, wherein the timing circuit further comprises a non-programmable integrated circuit timing device, wherein the timing device controls the energization period of the at least one LED by use of an RC time constant.

4. The lamp of claim 2 wherein the timing circuit further comprises a programmable microcontroller device, wherein the microcontroller device controls the energization period of the at least one LED by monitoring the photodetector device to determine ambient lighting conditions.

5. The lamp of claim 1 wherein the number of high-brightness LEDs is chosen from the group consisting of three, six, and twelve.

6. The lamp of claim 1 wherein the timing circuit directly controls the energization of the at least one LED through a switching transistor.

7. The lamp of claim 1 wherein the solar powered outdoor lamp is portable and completely self-contained within a single definable unit.

8. The lamp of claim 1 wherein the timing circuit controls the application of power to the at least one LED by limiting the application of power to a fixed period of time.

9. The lamp of claim 1 wherein the timing circuit controls the application of power to the at least one LED by limiting the application of power to a period of time of between approximately four and eight hours in duration.

* * * * *